United States Patent
Vasseur et al.

(10) Patent No.: US 9,736,056 B2
(45) Date of Patent: Aug. 15, 2017

(54) CENTRALIZED PREDICTIVE ROUTING USING DELAY PREDICTABILITY MEASUREMENTS

(71) Applicant: Cisco Technology, Inc., San Jose, CA (US)

(72) Inventors: Jean-Philippe Vasseur, Saint Martin d'Uriage (FR); Grégory Mermoud, Veyras (CH); Diane Bouchacourt, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 349 days.

(21) Appl. No.: 14/268,500

(22) Filed: May 2, 2014

(65) Prior Publication Data

US 2015/0319076 A1 Nov. 5, 2015

(51) Int. Cl.
*H04L 12/727* (2013.01)
*H04L 12/721* (2013.01)
*H04L 12/26* (2006.01)
*H04L 12/717* (2013.01)

(52) U.S. Cl.
CPC ........ *H04L 45/121* (2013.01); *H04L 43/0852* (2013.01); *H04L 45/123* (2013.01); *H04L 45/124* (2013.01); *H04L 45/42* (2013.01)

(58) Field of Classification Search
CPC . H04L 45/121; H04L 43/0852; H04L 45/123; H04L 45/124; H04L 45/42
See application file for complete search history.

(56) References Cited

U.S. PATENT DOCUMENTS

| 5,784,364 | A | 7/1998 | Ahn et al. | |
|---|---|---|---|---|
| 6,208,719 | B1 * | 3/2001 | Lo ................... | H04M 1/274566 379/114.03 |
| 6,226,266 | B1 | 5/2001 | Galand et al. | |
| 6,356,546 | B1 * | 3/2002 | Beshai ................ | H04L 45/302 370/358 |

(Continued)

FOREIGN PATENT DOCUMENTS

| EP | 2541849 A1 | 1/2013 | |
|---|---|---|---|
| WO | WO 2013001090 A1 * | 1/2013 | ........... H04L 45/121 |

OTHER PUBLICATIONS

Yolanda Tsang et al., titled "Network Radar: Tomography from Round Trip Time Measurements (Release Oct. 254-27, 2004)", (Tsang hereinafter) was published Oct. 25, 2004, pp. 01-06.*

(Continued)

*Primary Examiner* — Andrew Lai
*Assistant Examiner* — Hoyet H Andrews, III
(74) *Attorney, Agent, or Firm* — Parker Ibrahim & Berg LLC; James M. Behmke; Stephen D. LeBarron

(57) ABSTRACT

In one embodiment, a central device receives a routing strategy instruction that specifies a predictability threshold for communication delays in the network. The device estimates communication delays for a plurality of paths in the network and determines predictability measurements for the estimated delays. The device also selects, from among the plurality of paths, a particular path that has a predictability measurement that satisfies the predictability threshold and has a minimal estimated delay. The central device further installs the particular path at one or more other devices in the network.

20 Claims, 19 Drawing Sheets

(56) References Cited

U.S. PATENT DOCUMENTS

| | | | | |
|---|---|---|---|---|
| 6,728,777 | B1* | 4/2004 | Lee | H04L 12/1886 370/230 |
| 6,813,272 | B1* | 11/2004 | An | H04L 45/02 370/237 |
| 7,154,858 | B1* | 12/2006 | Zhang | H04L 12/2602 370/230 |
| 7,400,590 | B1* | 7/2008 | Rygh | H04L 12/462 370/254 |
| 7,693,093 | B2* | 4/2010 | Riedel | H04W 36/26 370/260 |
| 7,990,887 | B2 | 8/2011 | Cidon et al. | |
| 8,213,313 | B1* | 7/2012 | Doiron | H04L 43/028 370/235 |
| 8,279,864 | B2* | 10/2012 | Wood | H04L 12/5695 370/389 |
| 8,385,225 | B1* | 2/2013 | Downey | H04L 43/0864 370/252 |
| 8,510,464 | B2 | 8/2013 | Dharmistan | |
| 2001/0030962 | A1* | 10/2001 | Song | H04Q 11/0478 370/389 |
| 2002/0116154 | A1 | 8/2002 | Nowak et al. | |
| 2003/0140324 | A1* | 7/2003 | Yalcin | G06F 17/5022 716/108 |
| 2005/0094628 | A1 | 5/2005 | Ngamwongwattana et al. | |
| 2007/0076754 | A1* | 4/2007 | Krishnaswamy | H04L 45/12 370/468 |
| 2007/0213007 | A1* | 9/2007 | Florkey | H04L 45/121 455/18 |
| 2008/0123533 | A1* | 5/2008 | Vasseur | H04L 45/00 370/238 |
| 2009/0225671 | A1* | 9/2009 | Arbel | H04L 12/2602 370/252 |
| 2011/0164518 | A1* | 7/2011 | Daraiseh | H04L 45/121 370/252 |
| 2011/0176416 | A1* | 7/2011 | Bhatti | H04N 7/18 370/230 |
| 2011/0243030 | A1* | 10/2011 | Zhang | H04L 45/04 370/254 |
| 2013/0051250 | A1* | 2/2013 | Shaffer | H04L 45/22 370/252 |
| 2013/0077477 | A1* | 3/2013 | Daraiseh | H04W 40/14 370/225 |
| 2013/0159550 | A1 | 6/2013 | Vasseur | |

OTHER PUBLICATIONS

Dina Katabi et al., titled "Inferring Congestion Sharing and Path Characteristics from Packet Interarrival Times (Released 2001)", (Katabi hereinafter) was published 2001, pp. 01-13.*

Pal Varga, titled "Analyzing Packet Interarrival Times Distribution to Detect Network Bottlenecks, Book Subtitle: IFIP International Workshop on Networked Applications, Colmenarejo, Madrid/Spain, Jul. 6-8, 2005 (Released 2005)", (Varga hereinafter) was published 2005, pp. 17-29.*

Katabi, Dina et al.: "Inferrring Congestion Sharing and Path Characteristics from Packet Interarrival Times," Internet Article, Dec. 31, 2001, p. 13pp, URL:http://bitsavers.informatik.uni-stuttgart.de/pdf/mit/lcs/tr/MIT-LCS-TR-828.pdf, p. 1, right-hand column, line 20—line 39.

Varga, Pal: "Analyzing Packet Interarrival Times Distribution to Detect Network Bottlenecks," Eunice 2005, Aug. 6, 2005, pp. 17-29, URL:http://rd.springer.com/content/pdf/10.1007%2FO-387-31170-X_2.pdf.

Tsang, Yolanda et al: "Network Radar: Tomography from Round Trip Time Measurements," Proceedings of the 4th ACM SIGCOMM Conference on Internet Measurement, IMC '04, Jan. 1, 2004, pp. 175-180, New York, New York, USA, p. 178, left-hand column, line 27—p. 178, right-hand column, line 41.

International Search Report mailed Sep. 8, 2015 in connection with PCT/US2015/028112.

Farrel, et al., "A Path Computation Element (PCE)-Based Architecture", The Internet Society, Network Working Group, Request for Comments 4655, Aug. 2006, 41 pages, The Internet Society.

Gnawali, et al., "The Minimum Rank with Hysteresis Objective Function", Request for Comments 6719, Sep. 2012, 13 pages, Internet Engineering Task Force Trust.

Hinden, et al., "Initial IPv6 Sub-TLA ID Assignments", Network Working Group, Request for Comments 2928, Sep. 2000, 7 pages, The Internet Society.

Thubert, P., "Objective Function Zero for the Routing Protocol for Low-Power and Lossy Networks (RPL)", Request for Comments 6552, Mar. 2012, 14 pages, Internet Engineering Task Force Trust.

Vasseur, et al., "Routing Metrics Used for Path Calculation in Low-Power and Lossy Networks", Request for Comments 6551, Mar. 2012, 30 pages, Internet Engineering Task Force Trust.

Winter; et al., "RPL: IPv6 Routing Protocol for Low-Power and Lossy Networks", Internet Engineering Task Force, Request for Comments 6550, Mar. 2012, 157 pages.

* cited by examiner

US 9,736,056 B2

CENTRALIZED PREDICTIVE ROUTING USING DELAY PREDICTABILITY MEASUREMENTS

TECHNICAL FIELD

The present disclosure relates generally to computer networks, and, more particularly, to making routing decisions in time sensitive networks.

BACKGROUND

Time sensitive networks (TSNs) are a class of networks in which greater emphasis is placed on the control of packet delivery times. Interest in TSNs has increased in recent years in areas such as industrial automation, automotive control, media streaming, etc. For example, link layer technologies such as Deterministic Ethernet and Industrial Wireless Automation have emerged in recent years to enable the construction of a TSN. In general, these technologies operate by determining an amount of delay associated with a communication path in the network. The delivery time of a packet can then be calculated by offsetting the transmittal time of the packet by the delay. If the network is under relatively static conditions, the scheduling and delivery of packets within a TSN may be controlled with a high degree of precision.

Implementing a TSN routing strategy is particularly challenging within low power and lossy networks (LLNs) and other networks that experience varying network conditions. In comparison to traditional networks, these types of networks may exhibit lossy links, low bandwidth, limited battery operations, low memory and/or processing capabilities, etc. Changing environmental conditions may also affect device communications such as physical obstructions (e.g., the opening and closing of doors, changes in the foliage of nearby trees, etc.), changes in interference (e.g., from other wireless networks or devices), and changing propagation characteristics of the media (e.g., temperature or humidity changes, etc.). Accordingly, delays along a given communication path may also be variable, making it difficult to control packet delivery times in certain types of networks, such as LLNs.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
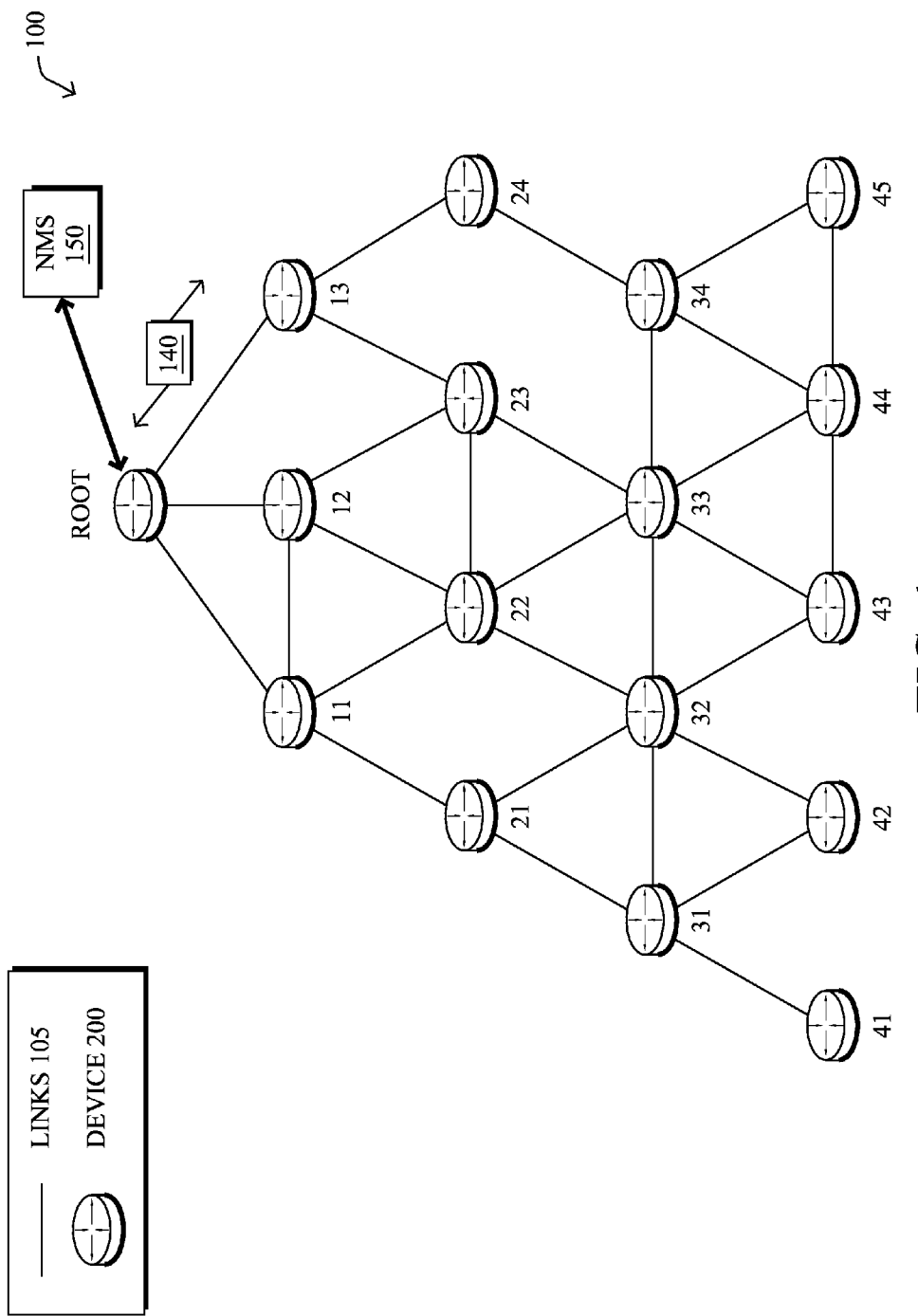
FIG. 1 illustrates an example communication network.

According to one or more embodiments of the disclosure, a device receives a routing strategy instruction that specifies a predictability threshold for communication delays in the network. The device estimates communication delays for a plurality of paths in the network and determines predictability measurements for the estimated delays. The device also selects, from among the plurality of paths, a particular path that has a predictability measurement that satisfies the predictability threshold and has a minimal estimated delay. The device further installs the particular path at one or more other devices in the network.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . .

"45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
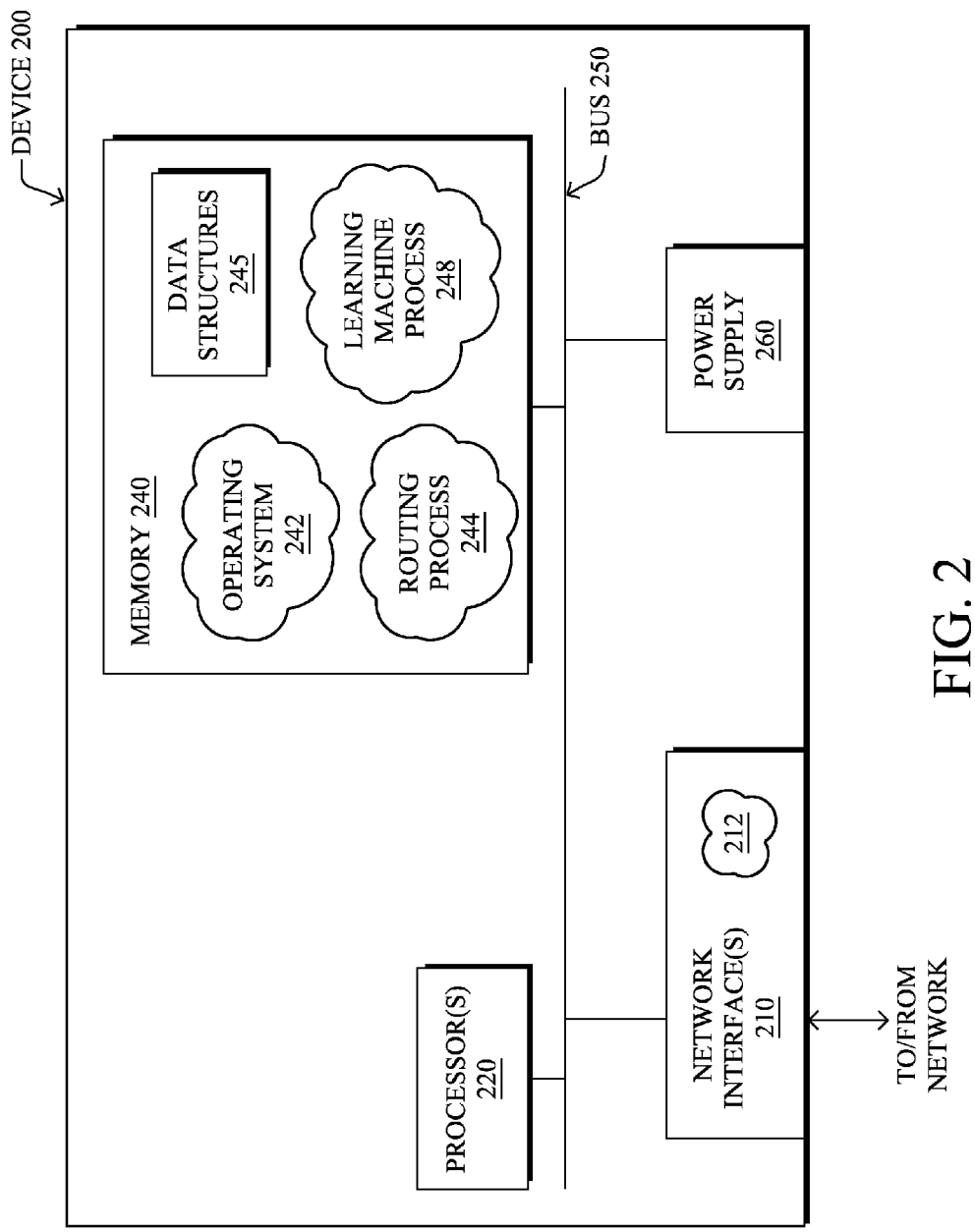
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and an illustrative learning machine process 248, as described herein. Note that while certain processes are shown in centralized memory 240, alternative embodiments provide for these processes to be specifically operated within the network interfaces 210, such as a component of a MAC layer (process "212").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built based on an Objective Function (OF). The role of the Objective Function is generally to specify rules on how to build the DAG (e.g., number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG' s primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks" <RFC 6551> by Vasseur, et al. (March 2012 version). Further, an example OF (e.g., a default OF) may be found in an IETF RFC, entitled "RPL Objective Function 0" <RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
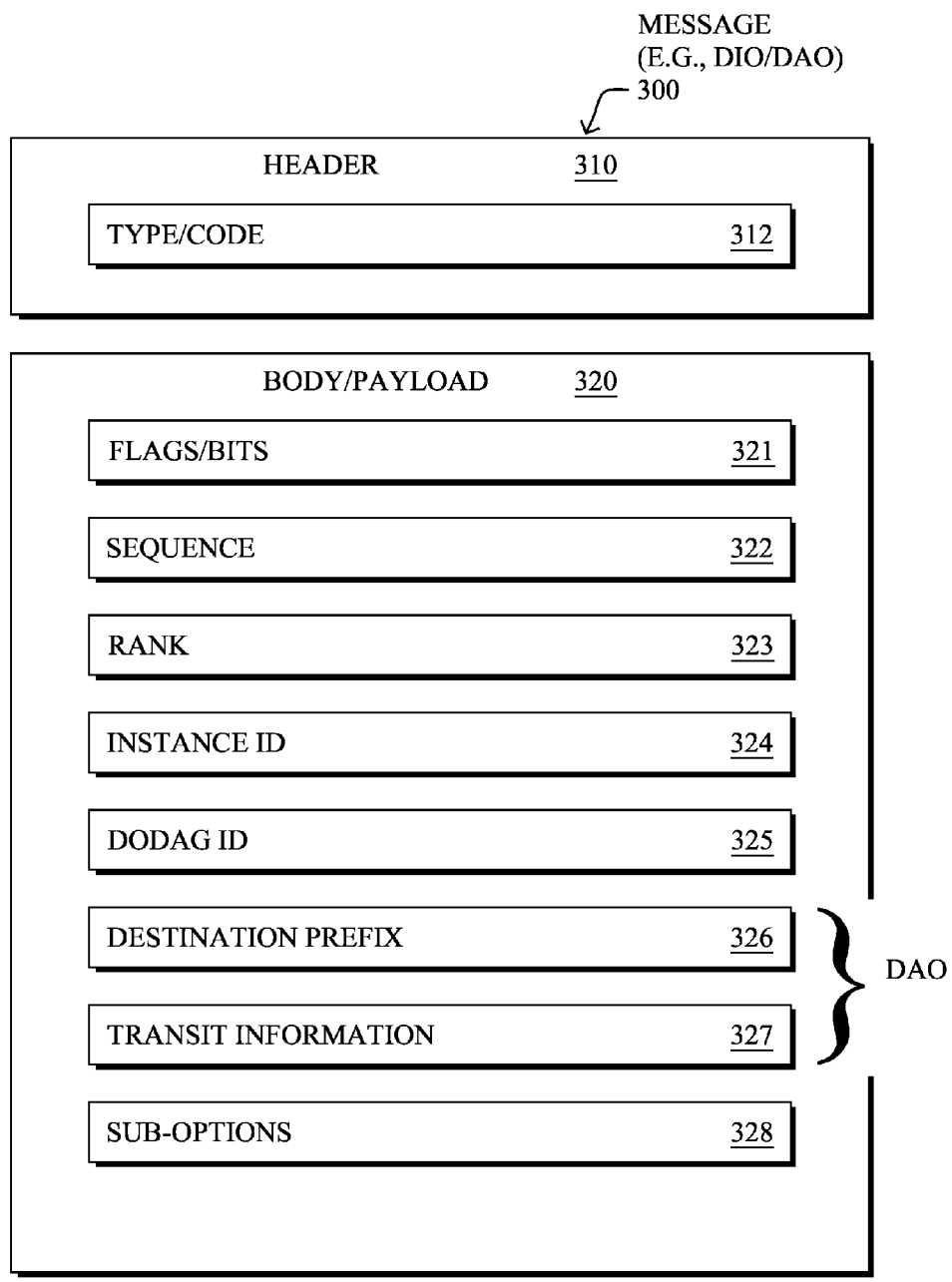
FIG. 3 illustrates an example message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
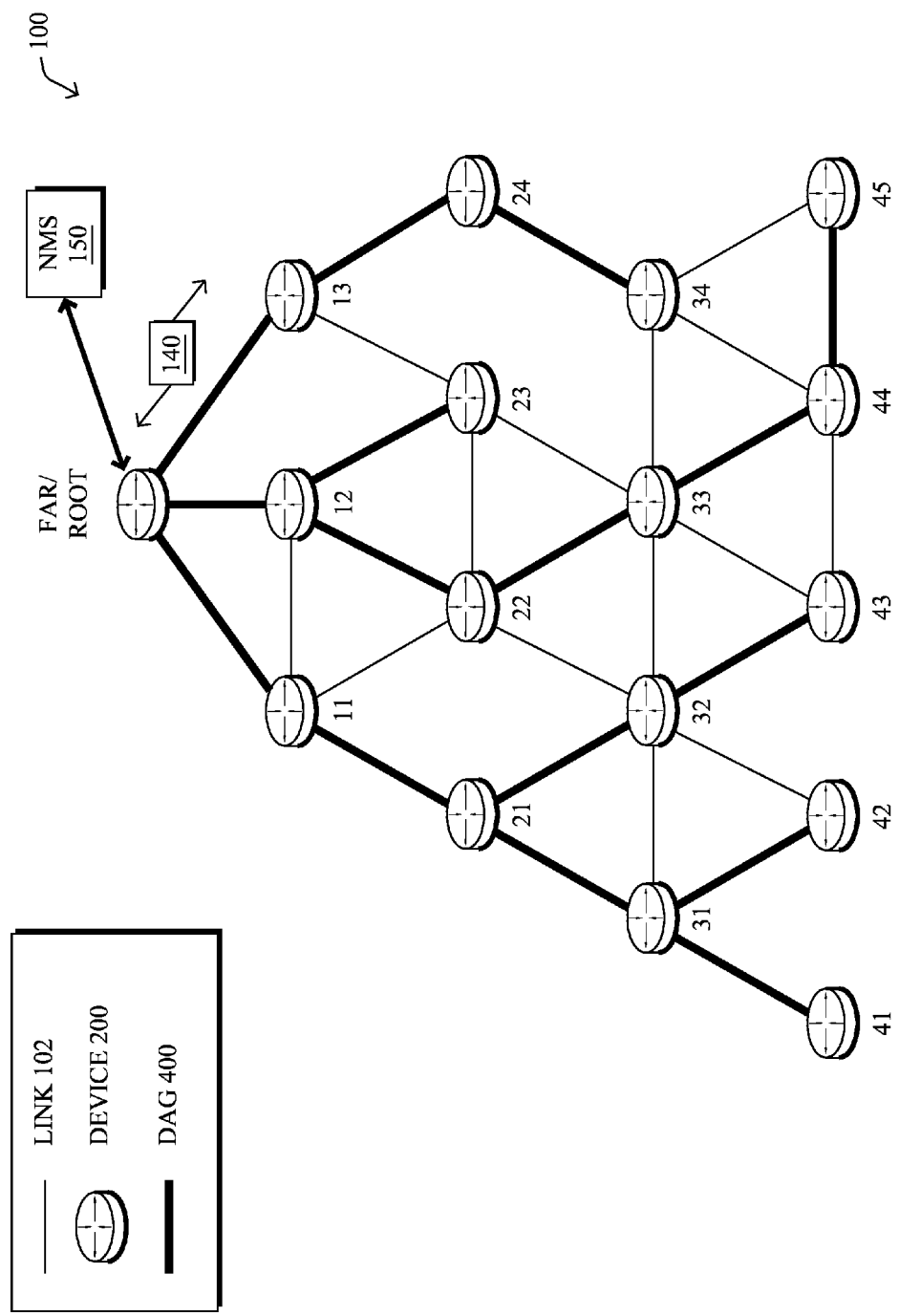
FIG. 4 illustrates an example directed acyclic graph (DAG) in the communication network.

FIG. 4 illustrates an example simplified DAG 400 that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 400 (shown as bolded lines), which extends from the root node toward one or more leaf nodes (nodes without children). Traffic/packets 140 (shown in FIG. 1) may then traverse the DAG 400 in either the upward direction toward the root or downward toward the leaf nodes, particularly as described herein.

As noted above, implementing time sensitive routing strategies in an LLN is challenging, since the delays along a given path may vary. In particular, approaches that attempt to optimize the network in terms of delay times, bandwidth allocations, or other such metrics may inadvertently select communication paths that exhibit high variations in their delay times. In cases where time sensitivity is paramount, however, the optimal choice of a communication path may be one that has a higher delay than another path but demonstrates a greater degree of predictability in its delay.

Centralized Predictive Routing Using Delay Predictability Measurements

The techniques herein provide for a centralized solution whereby a network device makes routing decisions based in part on how predictable a delay is along a path. In some aspects, a machine learning process estimates a communication delay along a path using network data such as the routing topology, traffic matrix, etc. For example, the device may generate a probability distribution function for the delay along a path. The device may also quantify the predictability of the delay using metrics regarding the distribution function (e.g., the moments of the function, a Sarle's coefficient, an entropy measurement, etc.). The predictability of the delay may then be used by the device to select and install a traffic route that exhibits a threshold amount of predictability.

Specifically, according to one or more embodiments of the disclosure as described in detail below, a device receives a routing strategy instruction that specifies a predictability threshold requirement for communication delays in a network. The device estimates communication delays for a plurality of paths in the network and determines predictability measurements for the estimated delays. The device may also select, from among the plurality of paths, a particular path that has a predictability measurement that satisfies the predictability threshold and has a minimal estimated delay. The central device may further install the particular path at one or more other devices in the network.

Illustratively, the techniques described herein may be performed by hardware, software, and/or firmware, such as in accordance with processes 244, 248, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various PLC protocols or wireless communication protocols, and as such, may be processed by similar components understood in the art that execute those protocols, accordingly.

Operationally, a central network device may perform path computations with the objective of maximizing the predictability of the delay along a path. This provides a sharp contrast to routing strategies that simply attempt to optimize the delay or bandwidth of the path itself, while still allowing for the bounding of other metrics. In other words, the techniques herein provide a different paradigm that can be used by TSN applications in the IoT, among other applications.

Figure 5A:
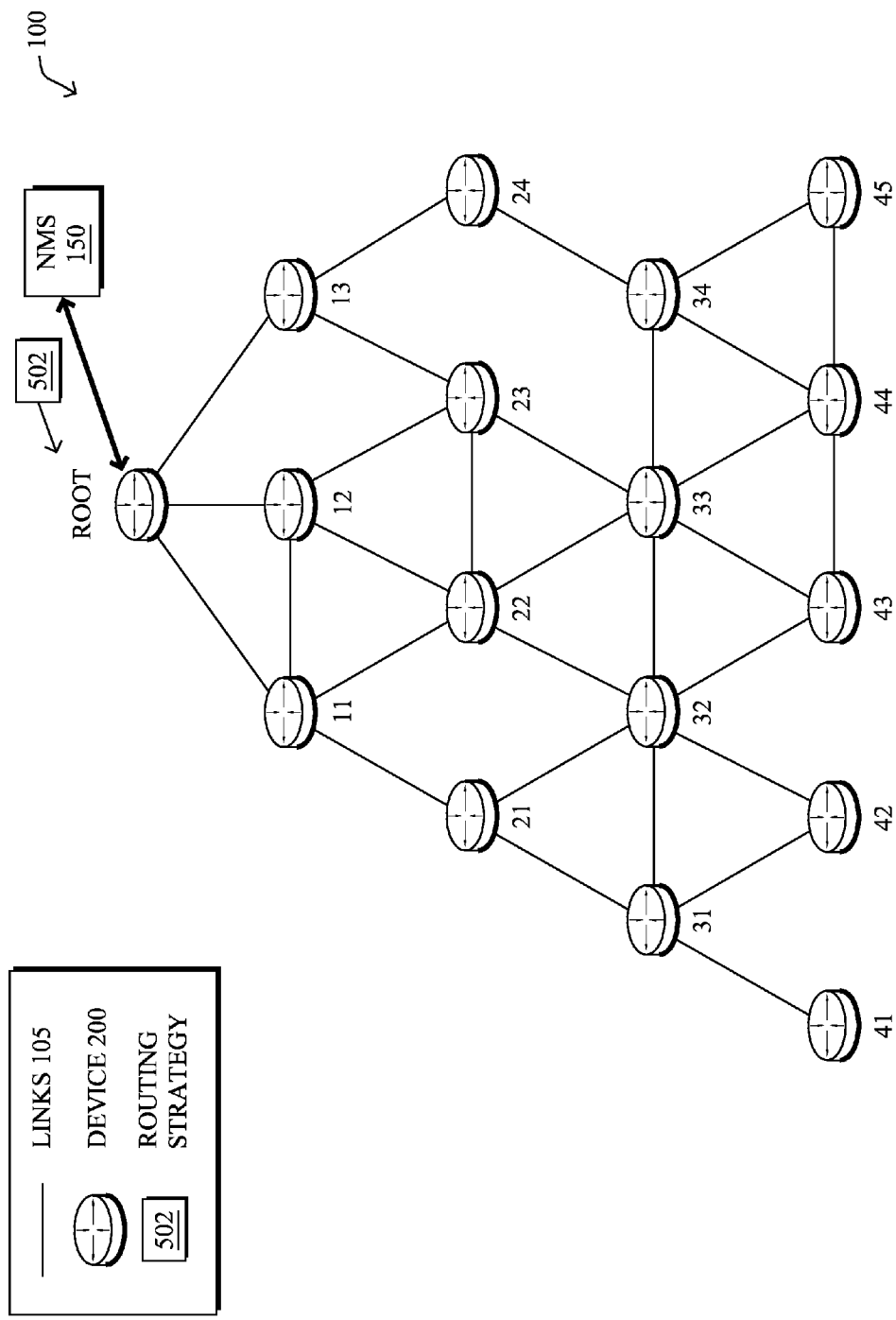
FIGS. 5A-5C illustrate examples of a root device/node determining network metrics.

In some embodiments, a new service level agreement (SLA) may be used that quantifies the predictability of a delay along a network path. In particular, a centralized network device such as a field area router (FAR), path computation engine (PCE), network root device/node, etc., may receive an instruction that includes a delay predictability threshold to be used when making routing decisions. In other words, the instruction may mandate that the central device only select routing paths that satisfy a threshold amount of predictability in their delays. For example, as shown in FIG. 5A, the network root device may receive a routing strategy instruction 502 from a network manager (e.g., NMS 150), policy engine, user interface, or any other supervisory device in the network. For example, instruction 502 may be a new unicast IPv6 message (e.g., CoAP or SNMP message) received by the root/FAR that specifies a set of one or more network attributes that are to be optimized or met when routing decisions are made.

In one embodiment, a routing strategy instruction may include any or all of the following parameters: <opt, max, pred, type>, where opt specifies that path delays should be used as the metric of choice to compute the best path (e.g., the metric the path should be optimized against), max specifies the upper tolerable bound for a delay, pred specifies a predictability threshold (e.g., the level of acceptable predictability for the delay), and type indicates the set of traffic types for which the delay SLA characteristics should be applied. In one example, instruction 502 may optionally indicate to the root device that the routing strategy is to be used only for video streaming traffic. As will be appreciated, such an instruction differs from other SLAs that simply specify the targeted amount of delay (e.g., a delay upper bound, mean, etc.) by introducing an additional constraint that is based on how predictable such a delay may be.

Figure 5B:
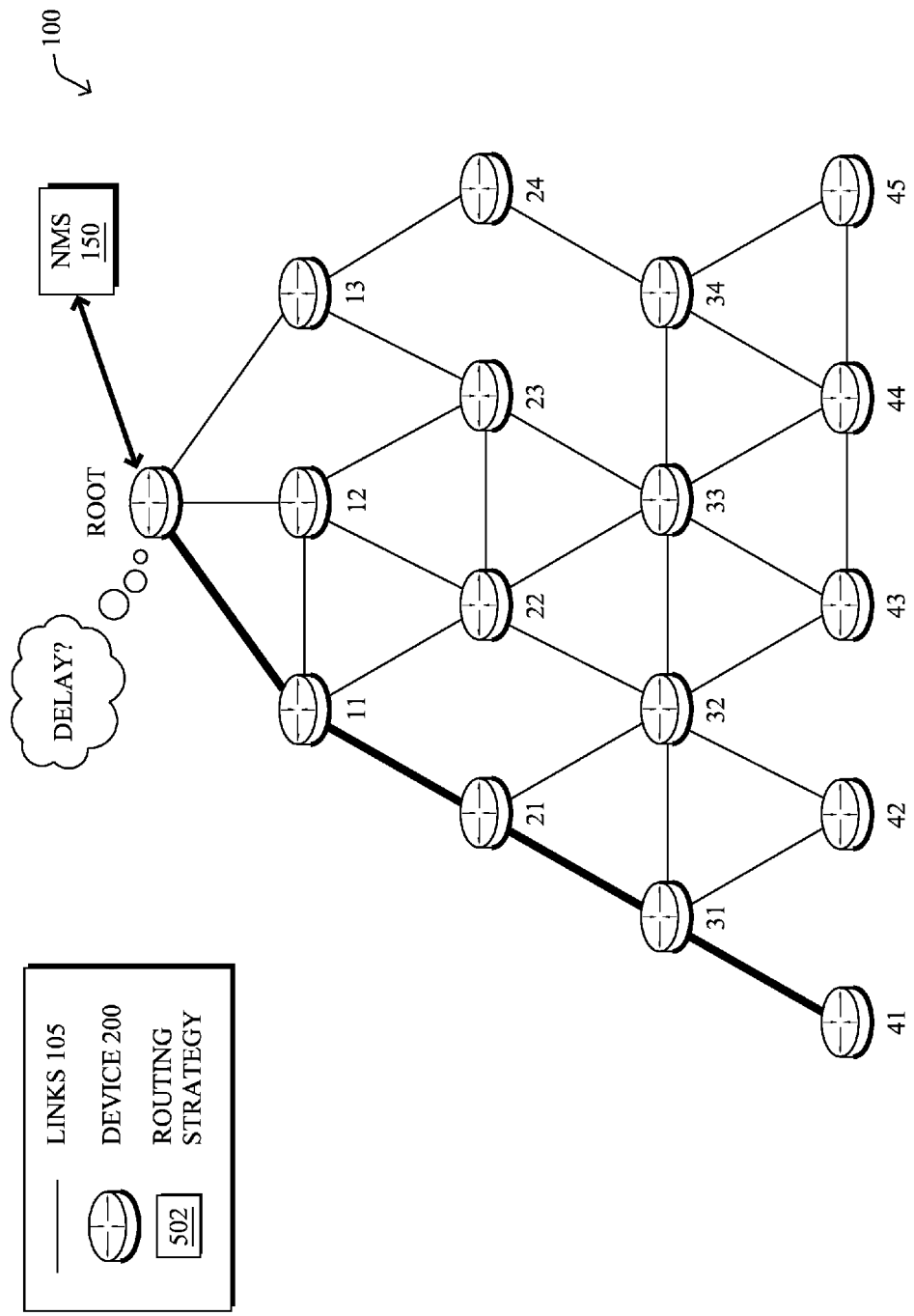
Figure 5C:
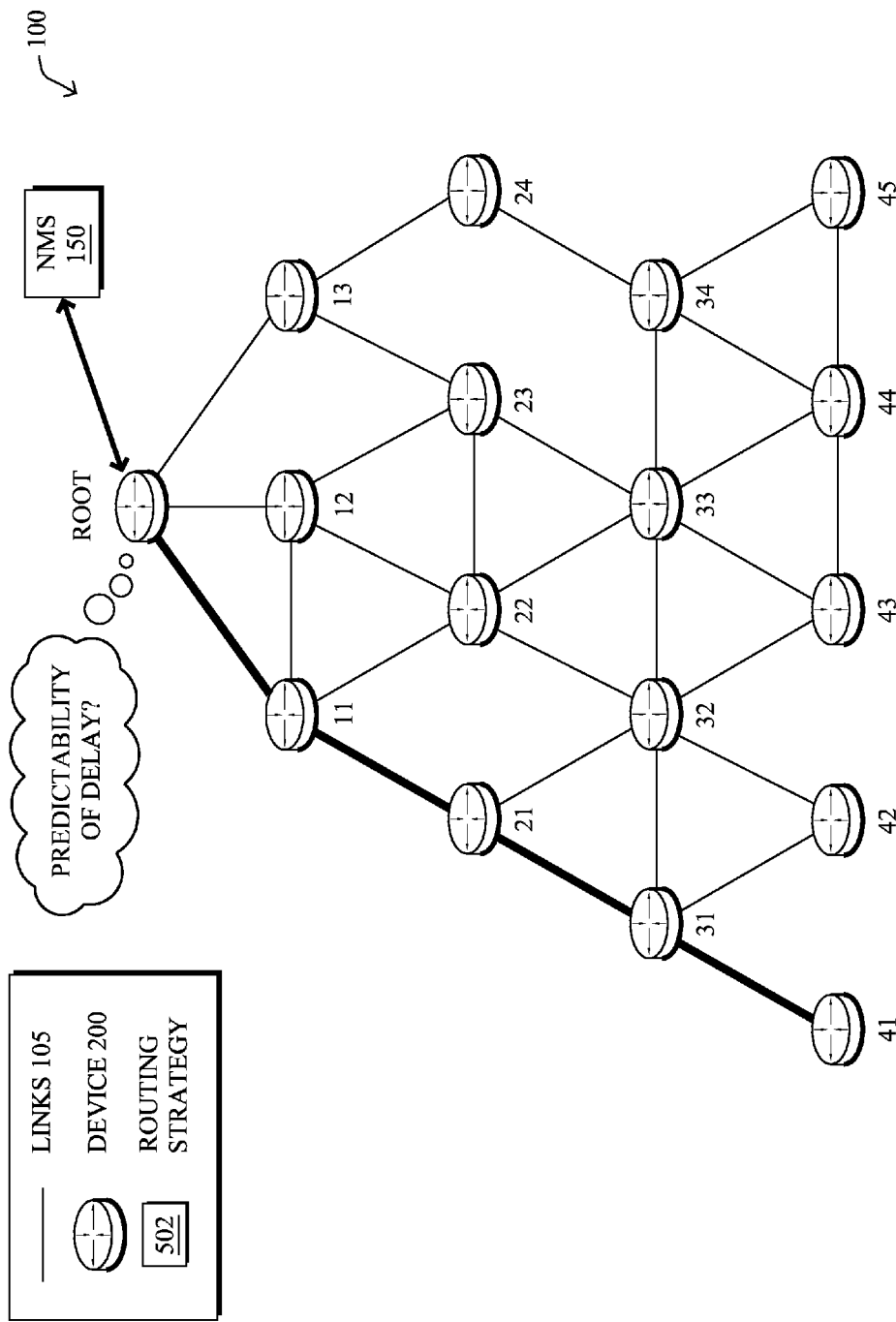

To predict the amount of delay along a network path, the centralized device may execute a machine learning process (e.g., learning machine process 248) that generates a probability distribution function to represent the predicted delay based on observations made about the network. For example, timestamped messages may be analyzed to determine how much delay was present when sending a particular message. The resulting distribution function from the machine learning process may be a probability density function (PDF), cumulative density function (CDF), or the like. In some embodiments, metrics regarding the distribution function may be used by the central device to quantify the predictability of the delay. For example, as shown in FIGS. 5B-5C, the root node/device may generate a distribution function regarding the delay along a given path (e.g., the highlighted path shown) and, based on such a distribution, also determine a predictability measurement for the delay.

Generally speaking, machine learning is concerned with the design and the development of processes that take as input empirical data (e.g., network statistics and performance indicators), and recognize complex patterns in these data. These patterns are then used to make decisions automatically (e.g., via close-loop control) or to help make decisions. Common tasks that may be performed using machine learning are the following: linear and non-linear regression, classification, clustering, dimensionality reduction, anomaly detection, optimization, association rule learning.

One very common pattern among machine learning processes is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The machine learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Figure 6A:
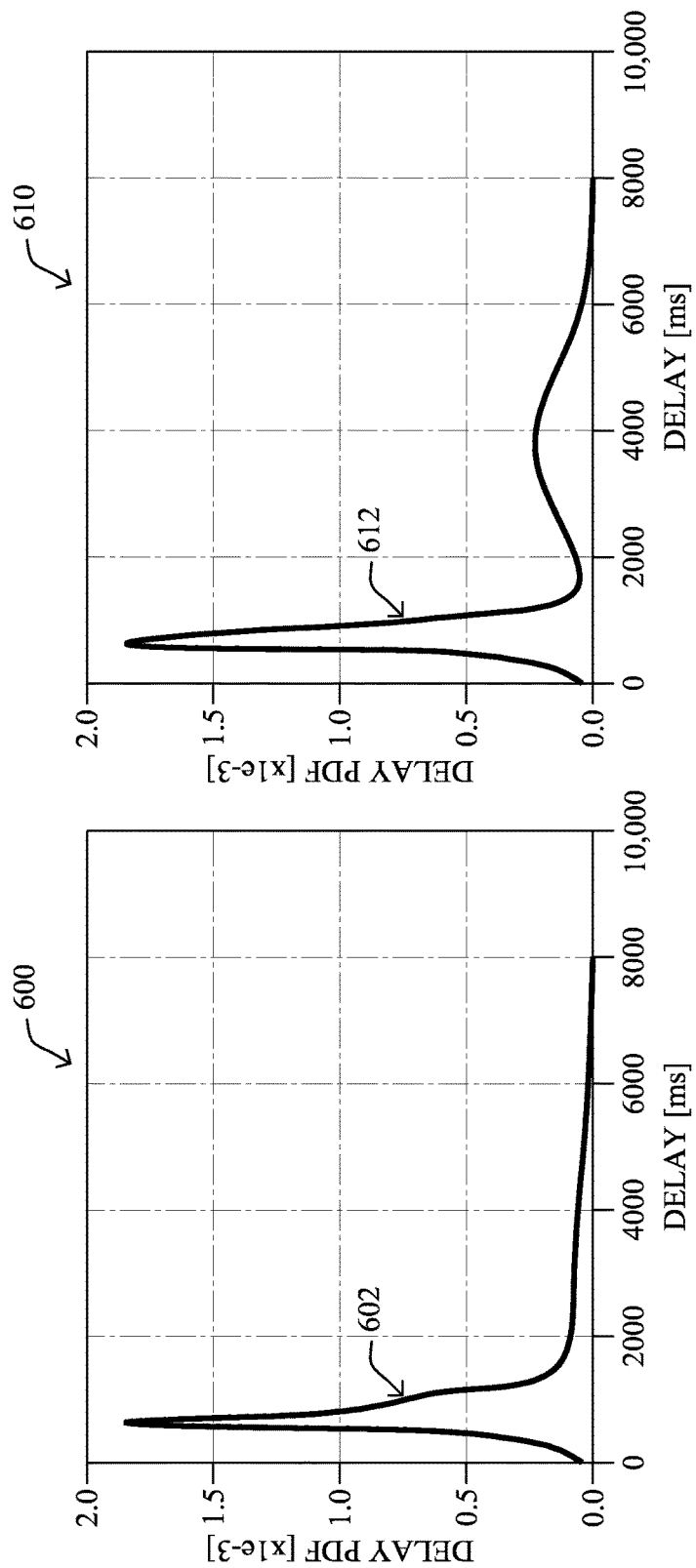
FIG. 6A-6F illustrates example delay probability distribution functions for different network segments.
Figure 6B:
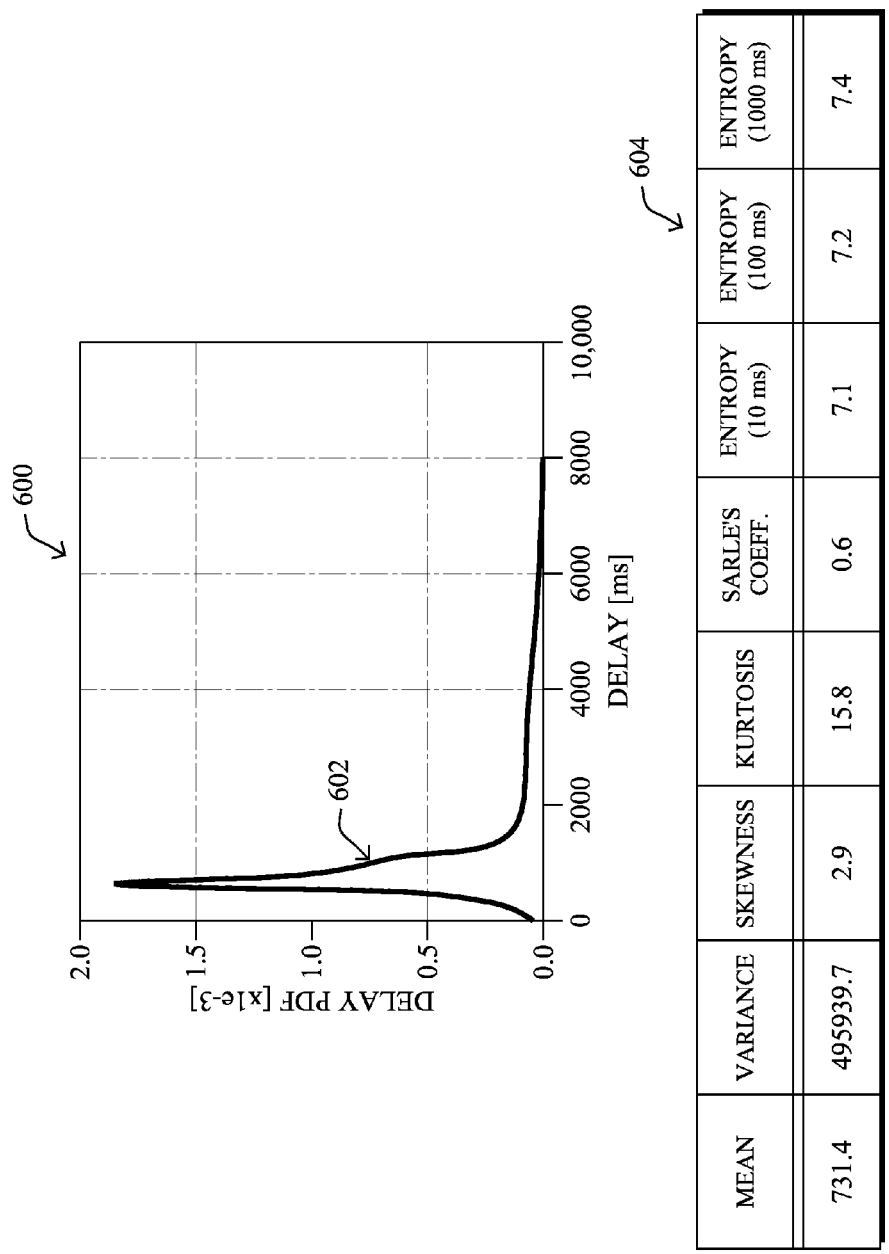
Figure 6C:
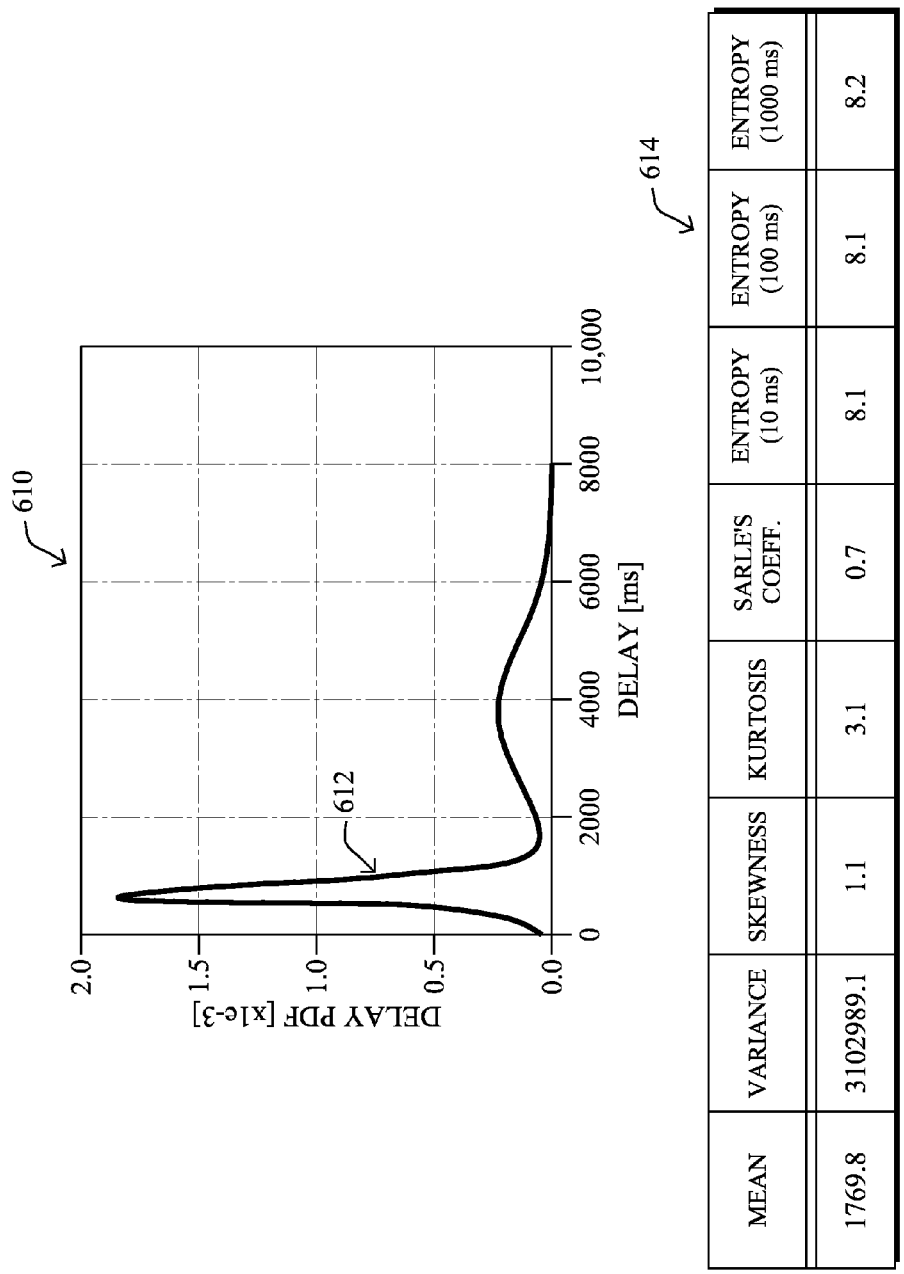
Figure 6D:
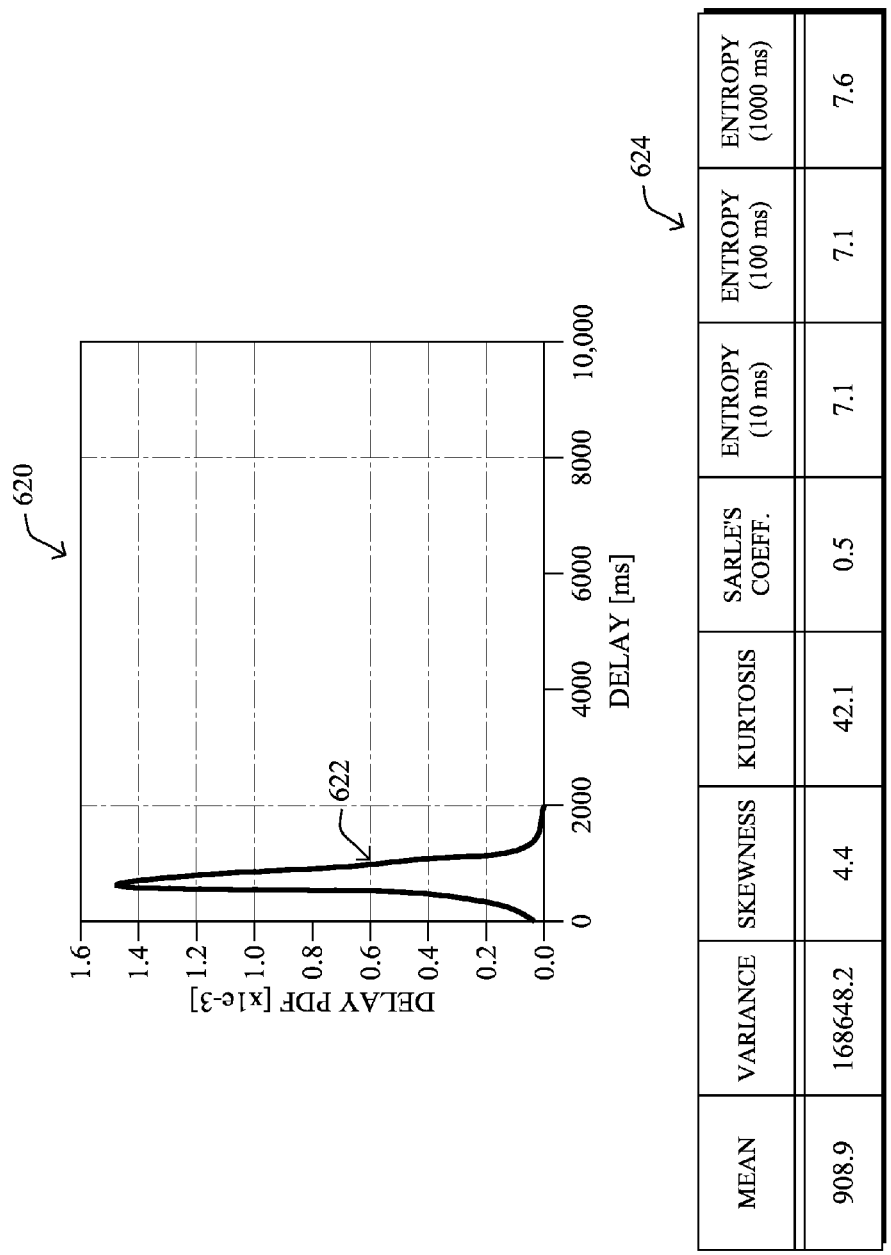
Figure 6E:
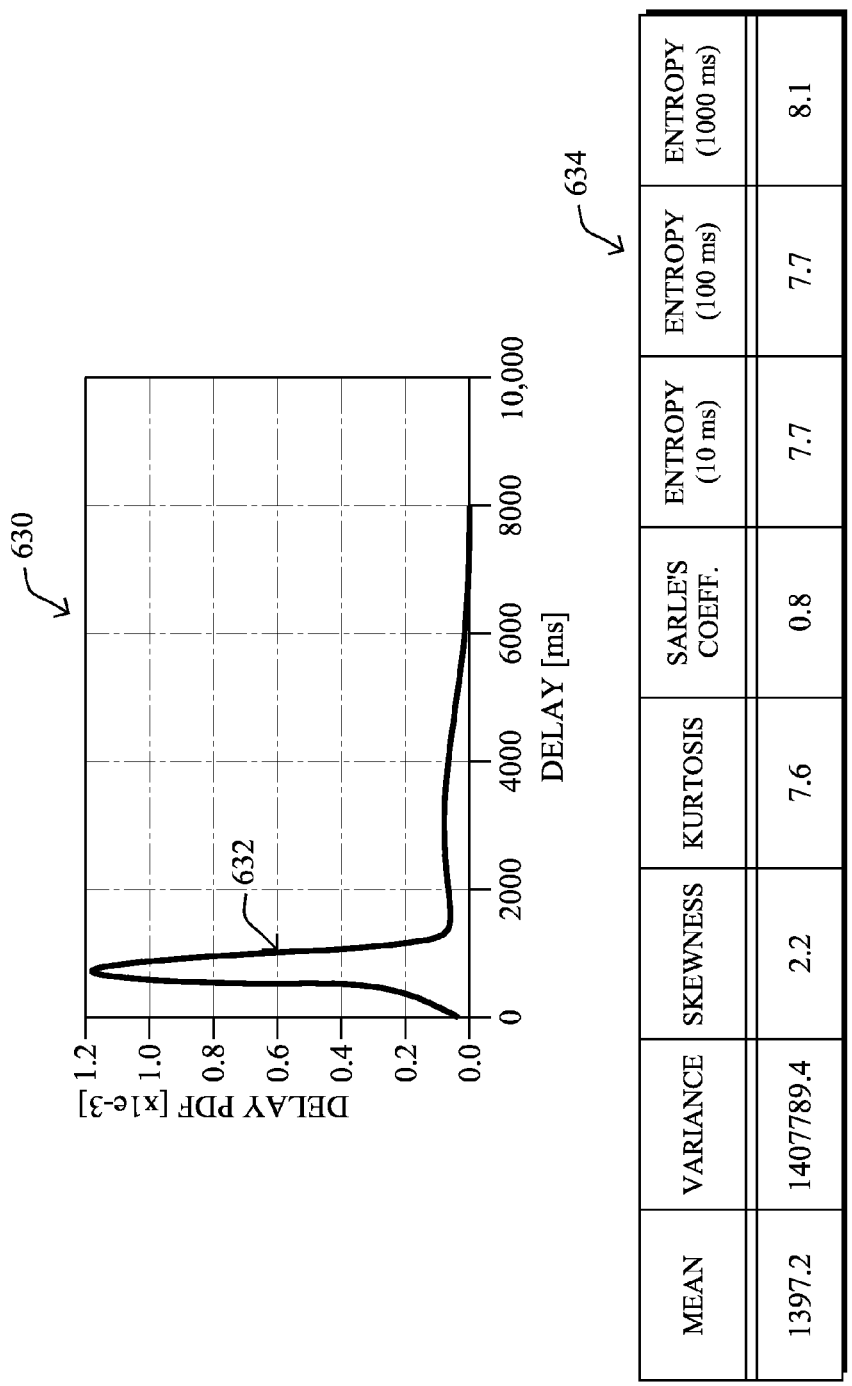
Figure 6F:
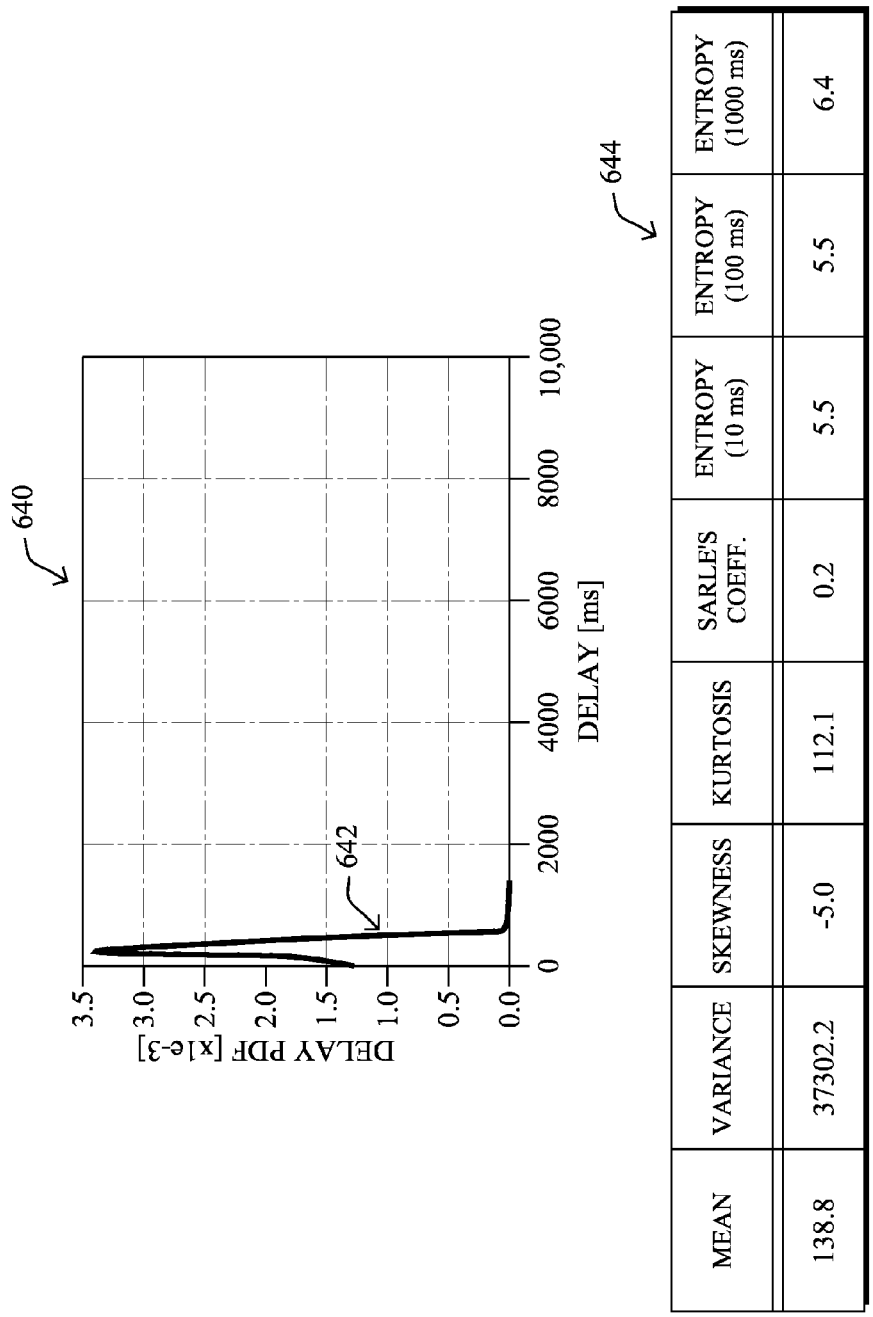

Referring now to FIG. 6A, example communication delays observed along different network segments are shown in plots 600, 610 as probability distribution functions 602, 612. As shown, probability distribution functions 602, 612 are probability density functions (PDFs) that represent how likely the segments are to experience a particular amount of delay. Based on the shape of function 602 in relation to function 612, it can be seen that delays along the path associated with function 612 are less predictable than for the path associated with function 602.

In various embodiments, a central node/device may quantify the predictability of the delay along the segment using one or more metrics regarding a generated probability function. FIGS. 6B-6F illustrate example plots 600-640 of probability distribution functions (e.g., functions 602, 612, 622, 632, and 642) of delays along different network segments and their respective metrics (e.g., metrics 604, 614, 624, 634, and 644) for different network segments.

In some cases, the predictability of the delay along a path/segment may be quantified using one or more moments of the predicted distribution of the delay. Such values may include the mean, variance, skewness (e.g., a measure of the asymmetry of the function), kurtosis (e.g., a measure of the "peakedness" of the function), or combinations thereof. For example, a vector of the form [mean, variance, skewness, kurtosis] may be used as a predictability measurement of the expected delay along a given network path. In the case where the delay is predicted with a mixture of normal distributions, the vector may also include a coefficient describing how multimodal the delay distribution is. Such coefficient may be a function of each normal component moments. For example, Sarle's bimodality coefficient (β) may be used as another measurement of the distribution function and can be computed as follows:

$$\beta = \frac{\gamma^2 + 1}{\kappa}$$

where γ is the skewness of the distribution function and κ is the kurtosis. The value of a Sarle's coefficient can vary from zero to one. Additionally, a Sarle's coefficient having a value of 5/9 indicates that the function has a uniform distribution. Typically, a Sarle's coefficient having a value greater than 5/9 may indicate a bimodal or multimodal distribution.

Entropy measurements from a generated probability function may also be used as a measure of how predictable the delay along a network segment is. Continuous or discrete entropy may be determined, in various cases. In addition, if the entropy is not computable from the expression of the PDF of the distribution, the entropy may be estimated empirically by discretizing the distribution. For example, in the case where the delay is predicted with a mixture of normal distributions, the histogram estimation of Shannon entropy may be calculated from the CDF and estimated from histogram with different bin sizes. The formula for the entropy of time scale size_bin is as follows:

$$\text{entropy} = \sum_{i=0}^{n} \frac{CDF(bin_i) * \log(CDF(bin_i))}{\text{size\_bin}}$$

As shown in FIGS. 6B-6F, entropy values may be calculated for each function using different bin sizes (e.g., 10 ms, 100 ms, and 1000 ms). Other bin sizes may be used in further implementations. Also shown are the mean, variance, skewness, kurtosis, and Sarle's coefficients for each function. As will be appreciated from FIGS. 6B-6F, the entropy values and Sarle's coefficients are relatively good measurements of the predictability of the delay along a network segment.

In one embodiment, the network device/node may analyze a path/traffic flow that has a delay predictability measurement that does not meet the predictability threshold specified in the routing strategy instruction. In such a case, the machine learning process may communicate with the routing process to retrieve the routing topology and other components residing in the router, in order to get information about the traffic matrix (e.g., using deep packet inspection (DPI) techniques, or Netflow (or other network monitoring process) records when available, augmented with Cisco™ Next Generation Network-Based Application Recognition NBAR2 classification when available). Additionally, such statistics may be available to the root/FAR in cases in which RPL is used in a non-storing mode, since all traffic transits through the FAR. At this point, for each path of interest (e.g., paths carrying traffic for which a predictability SLA has been specified), a process may be used by the FAR to compute the predictability of the path and check whether the Pred metric requirement is satisfied.

Figure 7A:
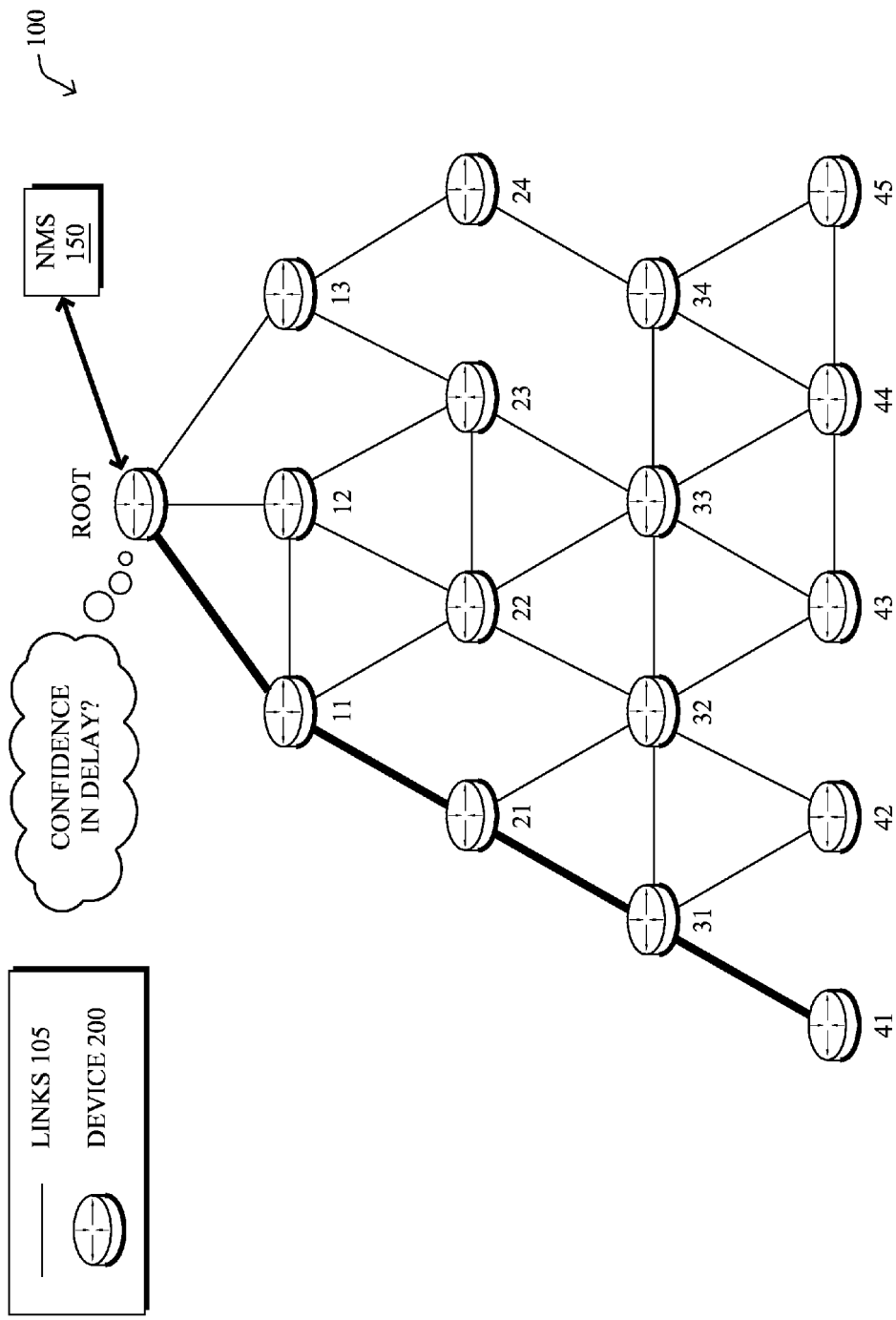
FIGS. 7A-7C illustrate examples of a root device/node recalculating network metrics.
Figure 7B:
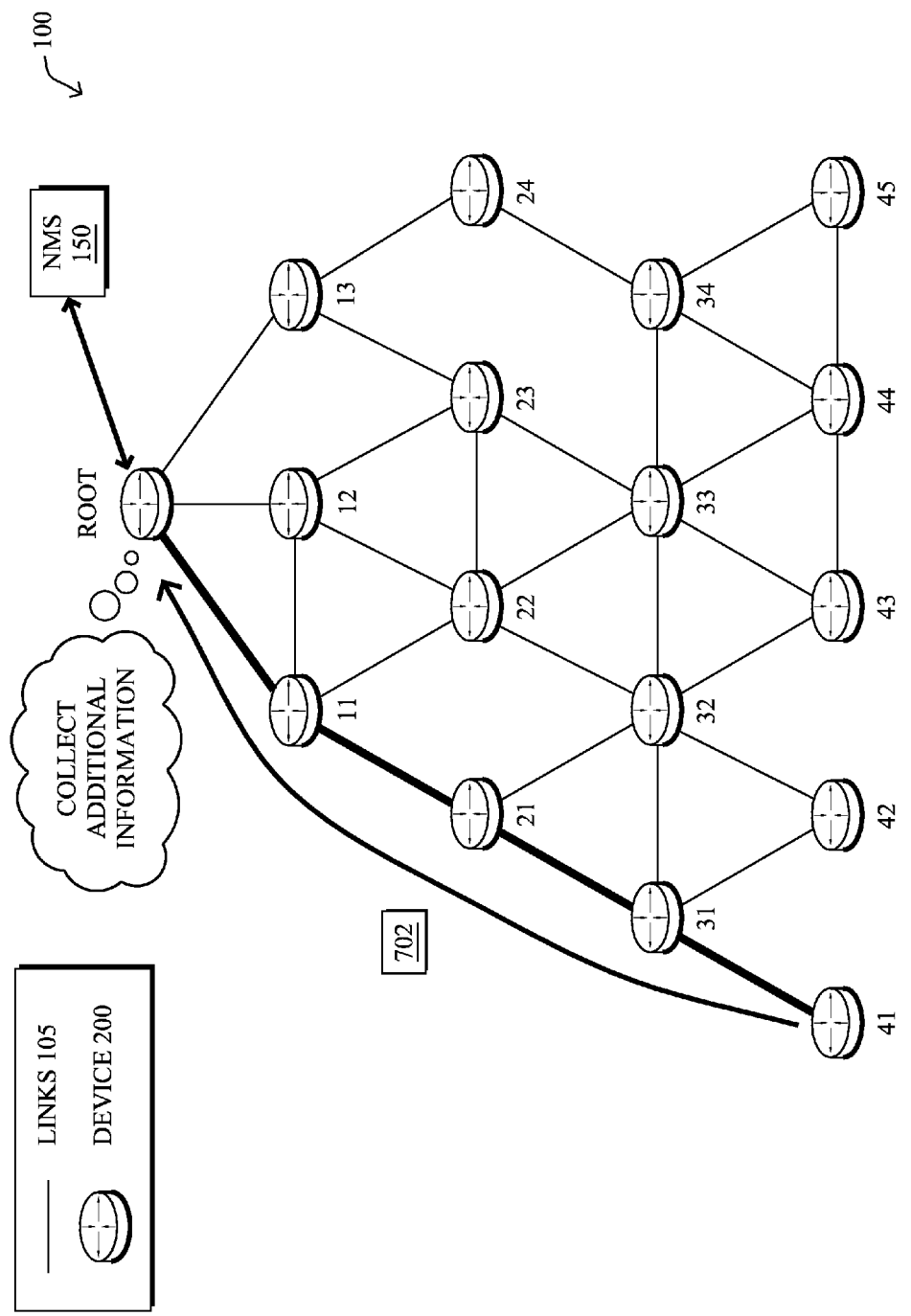
Figure 7C:
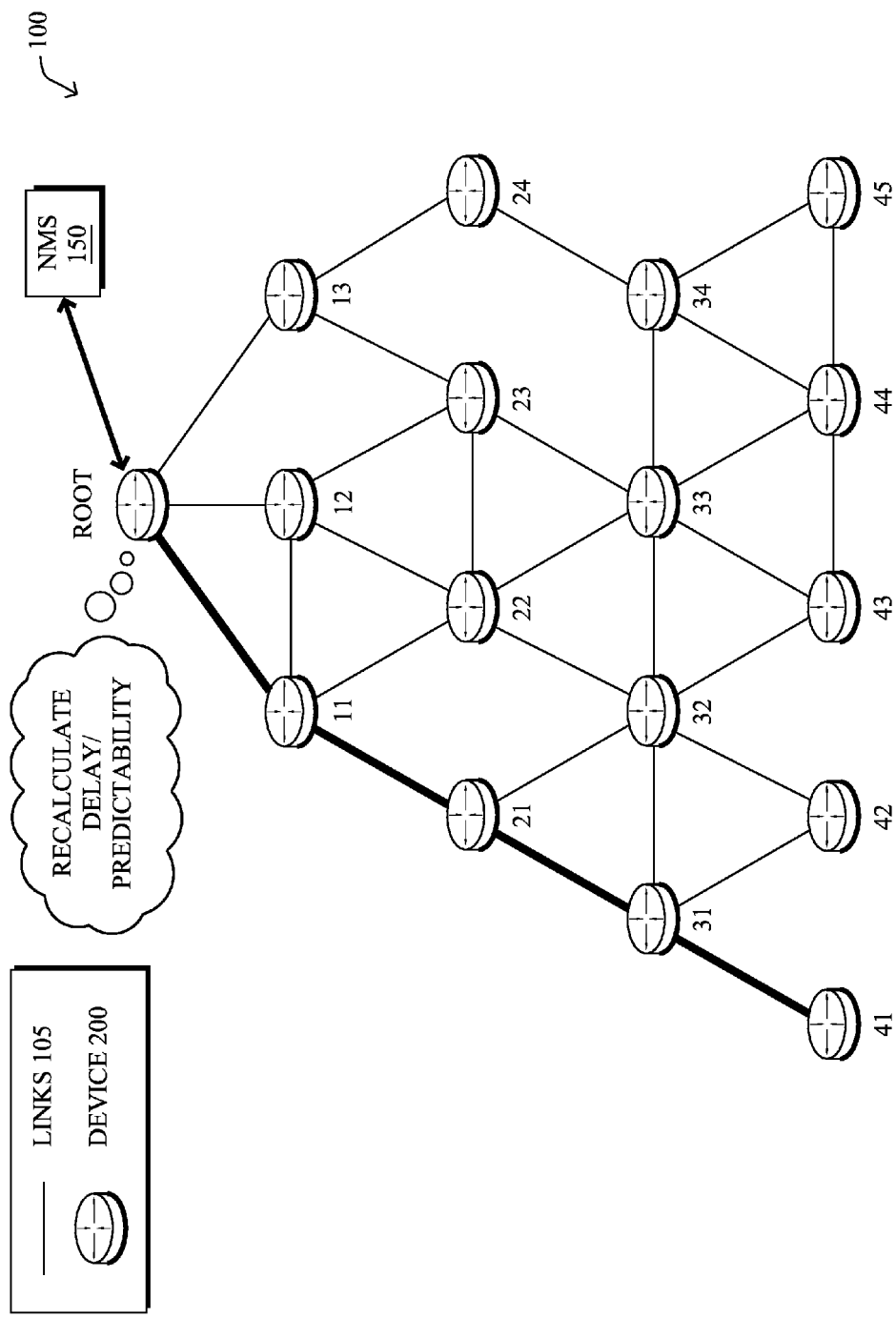

Referring now to FIGS. 7A-7C, a safe guard mechanism may be used by the central network device to avoid modifying paths for which the level of confidence of the predictive process itself is not sufficient. In other words, the device may determine a level of confidence (LC) metric that characterizes the goodness of fit of the predictive model specified in the second component. In various embodiments, the LC metric may be calculated using a chi-squared test, Kolmogorov-Smirnov test, or other goodness of fit metric. In further embodiments, the LC metric may be based on a confidence interval. If the LC metric for a given path for with a Pred metric must be satisfied falls below a confidence threshold, the device may respond in any number of ways. In some cases, the device may collect additional data regarding the path, to improve the LC metric of the delay predictions. For example, as shown in FIG. 7B, the root device may collect additional metrics 702 regarding the path under analysis. Using the additional metrics, the central device may then recalculate the delay predictions and/or the delay predictability measurement for the path, as shown in FIG. 7C. In some embodiments, the decision as to whether or not the path should be modified (e.g., as part of a closed-loop control) may be postponed until the LC metric reaches the confidence threshold. Rather than re-computing the delay predictions along the path, the central device may instead generate and provide a notification indicating that the ability to predict the delay or other metrics matching the signaled Pred metric is not high enough to take some action. Such a notification may be provided to the user interface device, NMS, policy engine, etc. that send the routing strategy instruction to the central device. In the case where the prediction is re-computed, the central device may send a similar notification requesting a grace period from the user interface, NMS, etc., after which the device may take some action.

In some embodiments, the central device may request nodes in the network to report additional data about their states (e.g., in addition to regularly reported data) and/or trigger the sending of probes towards a specific destination device/node. In one embodiment, such selective probing may be requested using a unicast IPv6 message to the sender of the probe that includes the destination and the set of probes to be sent. In another embodiment, a multicast message may be sent to all nodes in the network requesting that the nodes send probes to other nodes for a given period of time.

As noted previously, the central node/device may use a closed-loop approach to making routing decisions that meet the requested SLA. To that end, the device may inspect the network database (ND) that stores the network topology, the traffic flow matrix (e.g., data regarding the flows of traffic in the network), and the traffic SLA (e.g., the instruction that specifies the opt, max, pred, type, etc. parameters), in order to determine whether new routing paths better satisfy the SLA requirements. For example, in one embodiment, the central device may use a constrained shortest path first (CSPF) approach to making routing decisions. In such an approach, the set of constraints on each path is made of a series of constraints such as the delay predictability and maximum tolerable upper bound. For example, the central device may begin computing the set of paths between any pair of node <Ni,Nj> for which a predictability constraint has been specified (and potentially for a given traffic type) and then find the shortest path with regards to a given metric (e.g., delay) while taking into account the set of constraints (e.g., the predictability of the delay, the maximum delay, etc.). In contrast with additive metrics, such as the overall delay along a path, the predictability metric for a path is not simply the sum of all predictability metrics for the links along the path, but instead assesses the path as a whole.

Figure 8:
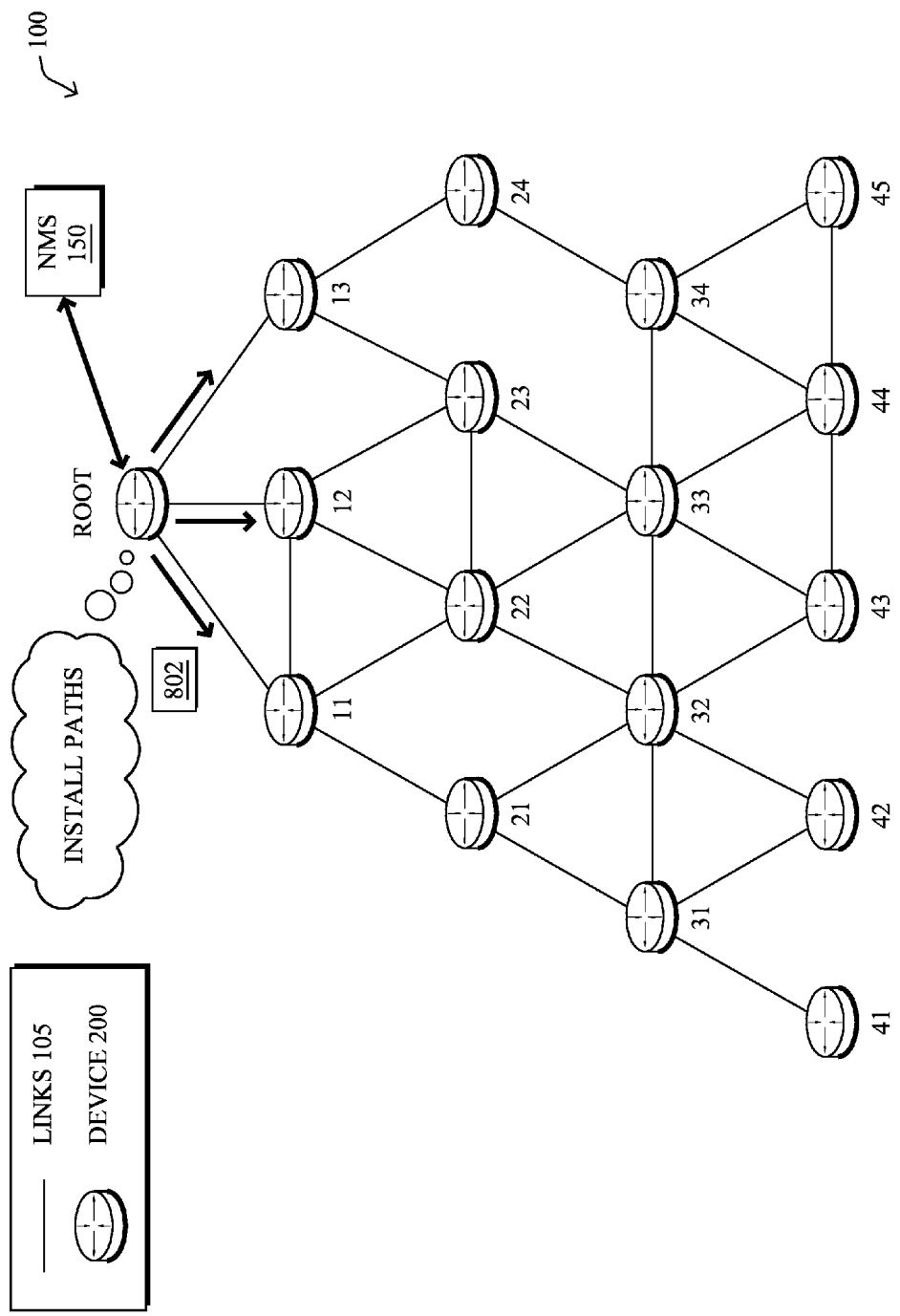
FIG. 8 illustrates an example of a routing path being installed.

Referring now to the example of FIG. 8, the central device (e.g., the root) may initiate a routing change by sending a route installation command 802 to one or more nodes in network. Such a command may be an override path message (e.g., a unicast IPv6 message) that is sent to each head-end node in the network requesting the use of a newly computed path, potentially for a given set of traffic path using source routing. As noted above, such a process may be iterative (e.g., as part of a closed-loop control strategy) and continuously updated since the network condition may change leading the device to potentially send updates according to its computations. In the case of the IoT, such an approach is totally centralized (e.g., co-located with the routing engine). Particularly in the context of LLNs and other constrained networks, this centralized approach may enable computing the delay predictability for a path, since such a computation may require aggregating a large volume of data not available to each node in the network. In addition, the computational costs of such a determination may not be compatible with the lightweight nature of LLNs where nodes may have limited processing resources available.

Figure 9:
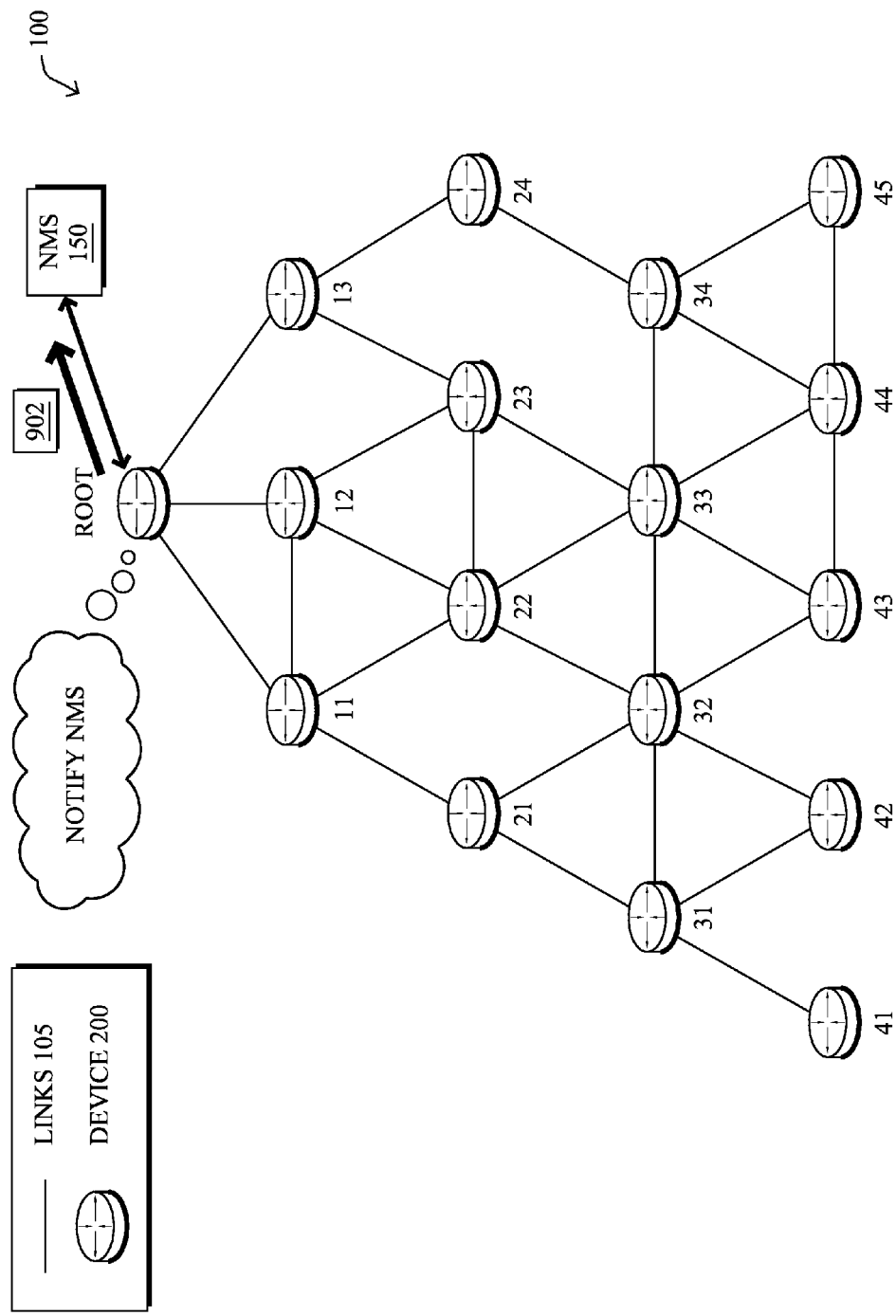
FIG. 9 illustrates an example of a root device/node sending a notification.

Referring now to the example of FIG. 9, the central device may provide notifications back to the NMS or other device that requested implementation of a routing strategy. For example, the network root/FAR may send a notification 902 to NMS 150 regarding the status of the routing process. For example, if no path satisfying the predictability constraint can be found, an IPv6 CoAP, SNMP, or XMPP message may be sent back to the policy engine, application policy infrastructure controller (APIC), or other centralized device, to report that the predictability constraint cannot be satisfied. In another example, if the central device requires additional time before affecting a routing change (e.g., due to a low degree of confidence in the delay predictions), the device may notify NMS 150 of this condition and/or request a grace period before making a routing change.

Figure 10:
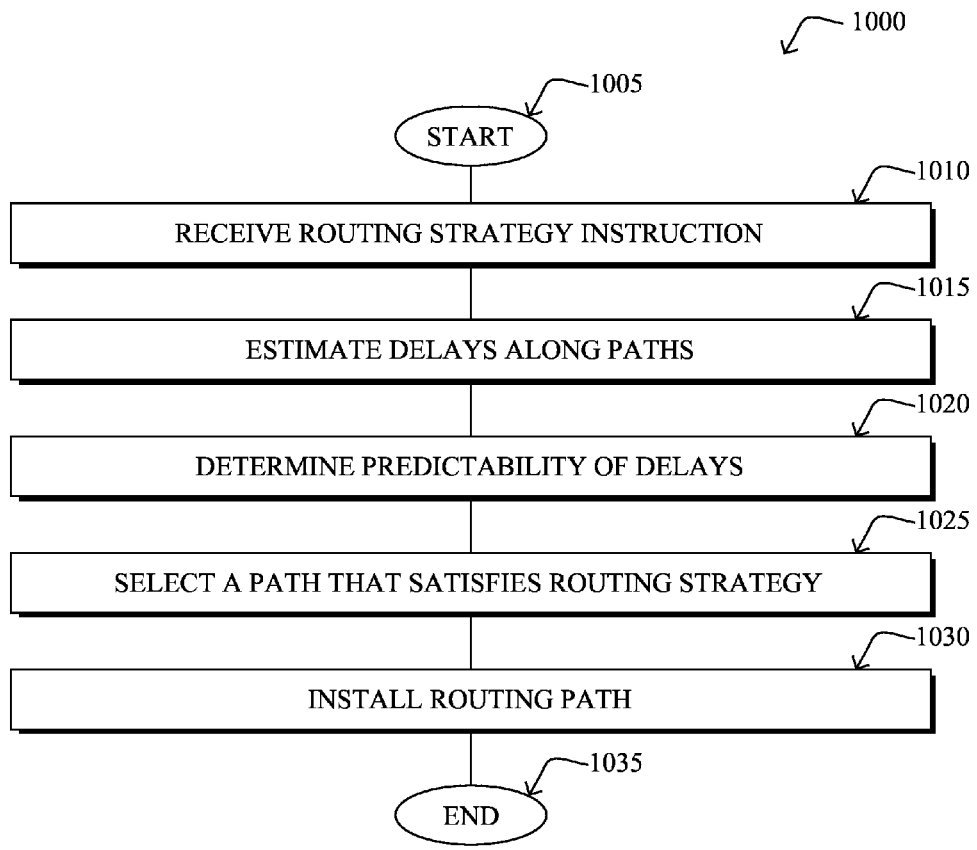
FIG. 10 illustrates an example simplified procedure for using a delay predictability measurement to control routing decisions.

FIG. 10 illustrates an example simplified procedure for using a delay predictability measurement to control routing decisions, in accordance with one or more embodiments described herein. The procedure 1000 may start at step 1005, and continues to step 1010, where, as described in greater detail above, a routing strategy instruction may be received by a central network device. For example, a FAR, network root, or other such device may receive an SLA request from an NMS, user interface device, policy engine, or other such device. In various embodiments, the instruction includes an indication that routing decisions are to be based in part on the predictability of delays along a selected routing path. For example, the instruction may specify a predictability threshold for estimated delays that must be satisfied before a given path may be used for routing purposes.

At step 1015, delays along a plurality of network paths are estimated, as detailed above. In various embodiments, a machine learning process may use network metrics for a path to generate a probability distribution function (e.g., PDF, CDF, etc.) for the amount of delay along the path. In some cases, the central device may also request or initiate the sending of probe packets throughout the network, to collect delay information about the paths.

At step 1020, as described in greater detail above, predictability measurements are determined for the delay estimates. In cases in which the delay estimates for a path are represented as a probability distribution function, the predictability measurement may be based on one or more metrics regarding the function. For example, as shown in FIGS. 6B-6F, a predictability measurement may be based on one or more of a mean, variance, skewness value, kurtosis value, Sarle's coefficient, or entropy measurement of the distribution function.

At step 1025, a routing path that satisfies the routing strategy is selected from among the analyzed paths, as detailed above. In various embodiments, the path is selected based in part on satisfying a predictability threshold for its estimated delay. In further embodiments, other metrics/constraints may also be used as part of the selection. For example, a particular routing path may be selected for use if it has the lowest estimated amount of delay and also satisfies the predictability constraint (e.g., by using the predictability measurement in a CSPF strategy). In another example, the path may be selected entirely based on its predictability measurement.

At step 1030, the selected routing path is installed in the network, as described in greater detail above. In various embodiments, an instruction may be sent by the central device to one or more network nodes that may use the path to reach a destination node. For example, the central device may send the instruction via an IPv6 unicast message to a head-end node, to instruct the node to use the selected routing path. Procedure 1000 then ends at a step 1035.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a centralized mechanism whereby routing decisions may be based in part on a predictability measurement for an estimated path delay. For time sensitive applications, such as in TSNs, these techniques allow for the more precise timing of packet scheduling and delivery within a network. In addition, the centralized approach may be well suited for LLN applications and in other such networks in which the processing capabilities of individual nodes are limited.

While there have been shown and described illustrative embodiments that provide for dynamic enabling of routing devices in a shared-media communication network, it is to be understood that various other adaptations and modifications may be made within the spirit and scope of the embodiments herein. For example, the embodiments have been shown and described herein with relation to PLC networks. However, the embodiments in their broader sense are not as limited, and may, in fact, be used with other types of shared-media networks and/or protocols (e.g., wireless) and even more generally with any other type of computing or communication network. In addition, while certain protocols are shown, such as RPL, other suitable protocols may be used, accordingly. Further, while the techniques herein have been described with respect to an estimated delay for a network path, the techniques may also be adapted for use with other determined network metrics. In other words, a predictability measurement for non-delay network metrics may also be used to make routing decisions, in other embodiments, in accordance with the techniques herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a device in a network, a routing strategy instruction that specifies a predictability threshold for communication delays in the network;
   estimating, at the device, the communication delays for a plurality of paths in the network;
   determining, by the device, predictability measurements for the estimated delays;
   selecting, by the device, from among the plurality of paths, a particular path that has a predictability measurement that satisfies the predictability threshold and has a minimal estimated delay of the estimated communication delays that satisfy the predictability threshold, wherein the particular path is selected, based in part, on how predictable a corresponding estimated delay of the estimated communication delays is along the particular path, wherein the predictability of the estimated delay is quantified by a distribution function; and installing, by the device, the particular path at one or more other devices in the network.

2. The method as in claim 1, further comprising:
determining a level of confidence value for an estimated communication delay for one of the plurality of paths; and
determining that the level of confidence value is below a confidence threshold.

3. The method as in claim 2, further comprising:
providing a notification that the level of confidence value is below the confidence threshold.

4. The method as in claim 2, further comprising:
collecting metrics regarding the path associated with the level of confidence value that is below the confidence threshold; and
re-estimating the communication delays along the path associated with the level of confidence value.

5. The method as in claim 1, wherein estimating the communication delays comprises:
generating delay probability distribution functions for the plurality of paths.

6. The method as in claim 5, wherein determining the predictability measurements comprises:
calculating one or more metrics regarding the delay probability distribution functions as the predictability measurements.

7. The method as in claim 6, wherein the one or more metrics regarding the delay probability distribution functions include an entropy measurement.

8. The method as in claim 6, wherein the one or more metrics regarding the delay probability distribution functions include at least one of: a mean, a variance, a skewness metric, a kurtosis metric, or a Sarle's coefficient.

9. The method as in claim 1, wherein the routing strategy instruction specifies a type of traffic for which the predictability threshold must be met.

10. An apparatus, comprising: one or more network interfaces to communicate with a low power and lossy network (LLN); a processor coupled to the network interfaces and adapted to execute one or more processes; and
a memory configured to store a process executable by the processor, the process when executed operable to:
receive a routing strategy instruction that specifies a predictability threshold for communication delays in the network;
estimate the communication delays for a plurality of paths in the network;
determine predictability measurements for the estimated delays;
select, from among the plurality of paths, a particular path that has a predictability measurement that satisfies the predictability threshold and has a minimal estimated delay of the estimated communication delays that satisfy the predictability threshold, wherein the particular path is selected, based in part, on how predictable a corresponding estimated delay of the estimated communication delays is along the particular path, wherein the predictability of the estimated delay is quantified by a distribution function; and
install the particular path at one or more devices in the network.

11. The apparatus as in claim 10, wherein the process when executed is further operable to:
determine a level of confidence value for an estimated communication delay for one of the plurality of paths; and
determine that the level of confidence value is below a confidence threshold.

12. The apparatus as in claim 11, wherein the process when executed is further operable to:
provide a notification that the level of confidence value is below the confidence threshold.

13. The apparatus as in claim 11, wherein the process when executed is further operable to:
collect metrics regarding the path associated with the level of confidence value that is below the confidence threshold; and
re-estimate the communication delays along the path associated with the level of confidence value.

14. The apparatus as in claim 10, wherein the communication delays are estimated by:
generating delay probability distribution functions for the plurality of paths.

15. The apparatus as in claim 14, wherein the predictability measurements are estimated by:
calculating one or more metrics regarding the delay probability distribution functions as the predictability measurements.

16. The apparatus as in claim 15, wherein the one or more metrics regarding the delay probability distribution functions include an entropy measurement.

17. The apparatus as in claim 15, wherein the one or more metrics regarding the delay probability distribution functions include at least one of: a mean, a variance, a skewness metric, a kurtosis metric, or a Sarle's coefficient.

18. The apparatus as in claim 10, wherein the routing strategy instruction specifies a type of traffic for which the predictability threshold must be met.

19. A tangible, non-transitory, computer-readable media having software encoded thereon, the software when executed by a processor operable to:
receive a routing strategy instruction that specifies a predictability threshold for communication delays in the network;
estimate the communication delays for a plurality of paths in the network;
determine predictability measurements for the estimated delays;
select, from among the plurality of paths, a particular path that has a predictability measurement that satisfies the predictability threshold and has a minimal estimated delay of the estimated communication delays that satisfy the predictability threshold, wherein the particular path is selected, based in part, on how predictable a corresponding estimated delay of the estimated communication delays is along the particular path, wherein the predictability of the estimated delay is quantified by a distribution function; and
install the particular path at one or more devices in the network.

20. The computer-readable media as in claim 19, wherein the software when executed is further operable to:
determine a level of confidence value for an estimated communication delay for one of the plurality of paths; and
determine that the level of confidence value is below a confidence threshold.

* * * * *